(12) United States Patent
Culver

(10) Patent No.: US 6,887,065 B2
(45) Date of Patent: May 3, 2005

(54) POLYMERIC MULTIFORM MEMBRANE MOLDING

(75) Inventor: Joseph A. Culver, Bardstown, KY (US)

(73) Assignee: Intertec Systems, Troy, MI (US)

(*) Notice: Subject to any disclaimer, the term of this patent is extended or adjusted under 35 U.S.C. 154(b) by 421 days.

(21) Appl. No.: 10/163,809

(22) Filed: Jun. 6, 2002

(65) Prior Publication Data

US 2003/0227110 A1 Dec. 11, 2003

(51) Int. Cl.[7] .............................................. B29C 41/36
(52) U.S. Cl. ...................... 425/435; 425/447; 425/448
(58) Field of Search ................................ 425/435, 447, 425/448; 264/DIG. 60

(56) References Cited

U.S. PATENT DOCUMENTS

| | | | | |
|---|---|---|---|---|
| 4,217,325 A | * | 8/1980 | Colby ................. | 264/DIG. 60 |
| 4,722,678 A | * | 2/1988 | Wersosky ................. | 425/435 |
| 4,755,333 A | * | 7/1988 | Gray ......................... | 425/435 |
| 4,925,151 A | * | 5/1990 | Gray ......................... | 425/435 |
| 6,409,493 B1 | * | 6/2002 | MacDonald et al. ........ | 425/435 |

* cited by examiner

Primary Examiner—James P. Mackey
(74) Attorney, Agent, or Firm—Dykema Gossett PLLC

(57) ABSTRACT

An apparatus for molding a polymeric multiform skin membrane is provided. The molding apparatus includes a rotatable heated mold envelope having an opening. Additionally the mold envelope has channel members which generally extend lateral of the opening. A feed-stock bucket is provided for holding polymeric work stock. The bucket is moved by a carriage in a direction generally parallel with the channel members of the mold envelope with a first lateral position for loading and a second position closing the opening of the mold envelope. Selectively actuatable clamps are provided for securing the bucket with the mold envelope.

16 Claims, 5 Drawing Sheets

POLYMERIC MULTIFORM MEMBRANE MOLDING

FIELD OF THE INVENTION

The field of the present invention is an apparatus for molding a polymeric multiform membrane and methods of utilization thereof.

BACKGROUND OF THE INVENTION

In the past, many automotive dashboards were fabricated from a metal stamping which was polished and then painted. In an effort to improve vehicle occupant safety in crash situations, padding was added to the side of the dashboard that faced towards the vehicle's interior. To lower manufacturing costs and also to lower vehicular weight, padded metal dashboards were replaced with composite dashboards.

Composite dashboards have a preform. The preform is typically fabricated from a rigid plastic material or a wood fiber compound. A foam polymeric material covers the preform to provide for cushioning. Placed on top of the foam polymeric material is a polymeric multiform skin membrane, which typically has an outer surface to simulate a smooth textured appearance similar to that of leather. To fabricate such a composite dashboard typically the skin membrane is placed into a mold spaced away from the rigid preform. The material that provides the foam cushioning is then shot into the mold and adheres to both the preform and skin membrane to form a composite dashboard.

Prior to its placement into the mold to form the composite, the skin membrane is formed in a separate molding operation. To form the skin membrane, there is provided a rotatable mold cavity or envelope. The mold envelope is heated. Powdered thermal formable plastic feed-stock material is placed within a bucket. The bucket is moved laterally to a position placing it underneath an opening of the mold envelope. The bucket is then elevated and is aligned with the mold envelope via an arrangement of alignment pins on the bucket sliding into blocks on the mold envelope. A clamping mechanism then clamps the bucket to the mold envelope. A positioning mechanism that elevates the bucket to the mold envelope, is then lowered, and the mold envelope and bucket are rotated, allowing the powdered plastic feed stock to fall into, melt and adhere to the mold envelope to form a multiform skin membrane.

Although the aforementioned molding apparatus and process has been successfully utilized it presents several disadvantages. The bucket has to be moved laterally and vertically, which causes alignment problems in both movement processes. Also, the bucket is initially at a much lower level than the mold envelope during its lateral movement. Thus, the mold envelope has to be elevated (if it is desired to keep the bucket close to floor level or slightly above) or the bucket must be placed in a pit to allow it to be elevated to the mold envelope, which is positioned near floor level. The fact that the mold envelope and the bucket are often at two different elevations increases the capital costs of such a molding arrangement. A further disadvantage is the use of cycle time by the lateral and vertical movements of the feed stock bucket in joining it to the mold envelope.

It is desirable to provide a molding apparatus and method of utilization thereof that alleviates the aforementioned disadvantages when molding polymeric membranes.

SUMMARY OF THE INVENTION

To make manifest the above-delineated desires, a revelation of the present invention is brought forth. In a preferred embodiment, the present invention brings forth an apparatus and method of utilization thereof for molding a polymeric multiform skin membrane. A rotatable heated mold envelope is provided. The mold envelope has an opening. Additionally, the mold envelope has channel members which generally extend laterally of the opening. A feed-stock bucket is provided for holding the polymeric material. In most instances the polymeric material will be presented in powdered form, however, the bucket can accommodate liquid feed stock. The bucket is moveable in a direction generally parallel to the channel members of the mold envelope. The bucket has a first position which is lateral of the mold envelope to allow it to be loaded with feed stock material. The bucket has a second position wherein it is captured by the channel members and closes the opening of the mold envelope. Selectively actuatable clamps are provided for securing the bucket to the mold envelope. A carriage is provided for laterally moving the bucket between the first and second positions.

The present invention provides an advantage in that the bucket need not be elevated to mate with the mold envelope. Therefore, capital expenditures are reduced. Because no significant vertical motion is required of the bucket, cycle times are reduced. Because the bucket only moves in the lateral direction parallel to the channel members, alignment problems are significantly reduced.

The aforementioned and other advantages will become more apparent to those skilled in the art as the invention is revealed in the drawings and the accompanying detailed description.

DETAILED DESCRIPTION OF THE INVENTION

Figure 1:
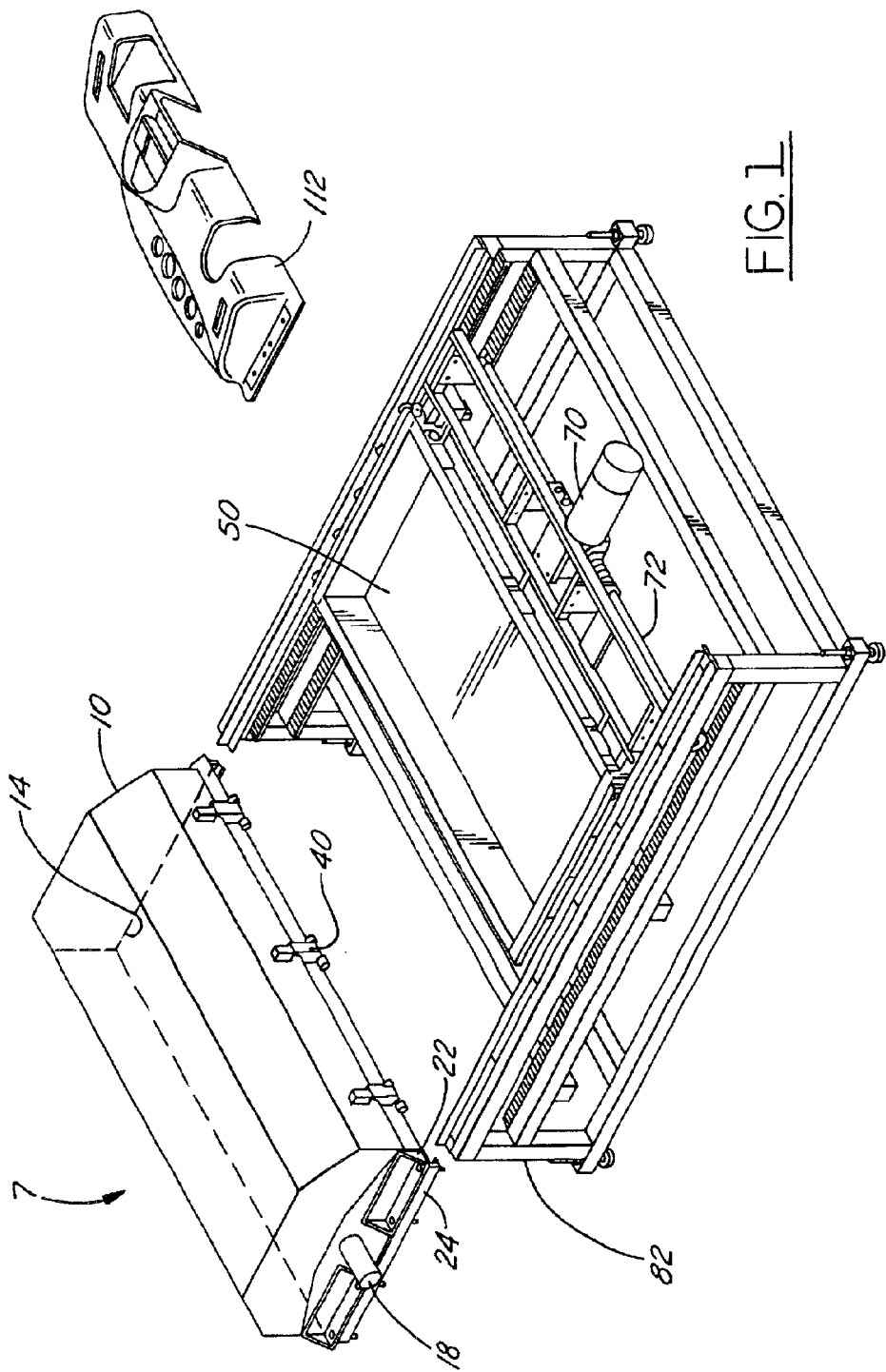
FIG. 1 is a perspective view illustrating an apparatus for molding a polymeric multiform membrane according to the present invention.
Figure 2:
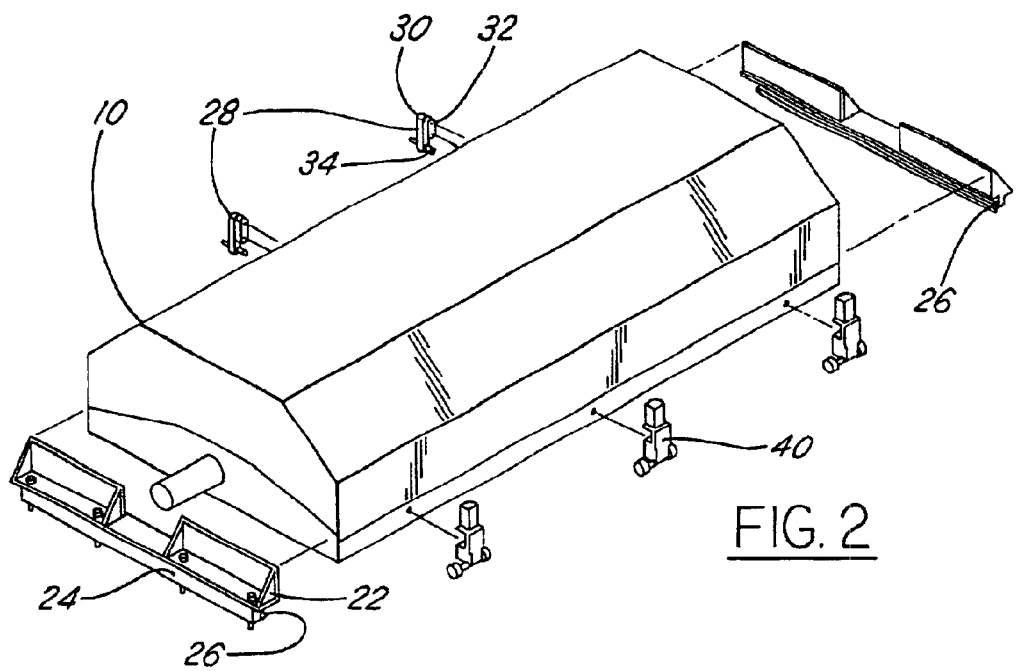
FIG. 2 is an exploded view of the mold envelope shown in FIG. 1 additionally illustrating various attached components.

Referring to FIGS. 1–6, an arrangement or apparatus 7 for molding a polymeric multiform skin membrane is provided. The mold apparatus 7 includes a mold envelope 10. The mold envelope 10 is approximately 30 inches wide and approximately 78 inches long. The mold envelope forms a cavity having an opening 14 which is typically oriented vertically downward. The mold envelope is supported about opposite ends by a structure 16. Between the structure 16 and the mold envelope 10 are shafts 18. The mold envelope 10 rotates with respect to the structure 16 along the shafts 18.

Additionally, coextensive with shaft 18 or in close vicinity thereof are a series of connections allowing for the transfer of hot oil or steam for the heating of the mold envelope. If hot oil or steam were not utilized, the connection can also be electrical to provide current to heaters, embedded or connected to the mold envelope 10, to heat the same. Additional fluid lines can be connected between the structure 16 and mold envelope 10 to provide for cooling fluid to cool the mold envelope 10 if a cooling process is called for in the molding operation.

Fixably connected to the mold envelope 10 by welding or other appropriate means are brackets 22. The brackets 22 have boltably connected thereto channel members 24. The channel members 24 extend generally lateral of the opening 14. The channel members 24 have an opening 26, oriented inboard towards the mold envelope opening 14. On one of the longitudinal sides of the mold envelope there is fixably connected a series of stops 28. The stops 28 include a main body 30, connected to a spacer 32, which abuts the mold envelope 10. A bottom portion of the main body 28 has projecting therefrom a cone 34.

Connected on the mold envelope generally opposite the stop 28 are a series of clamps 40. The clamps are typically pneumatically powered and can be selectively actuated.

Figure 4:
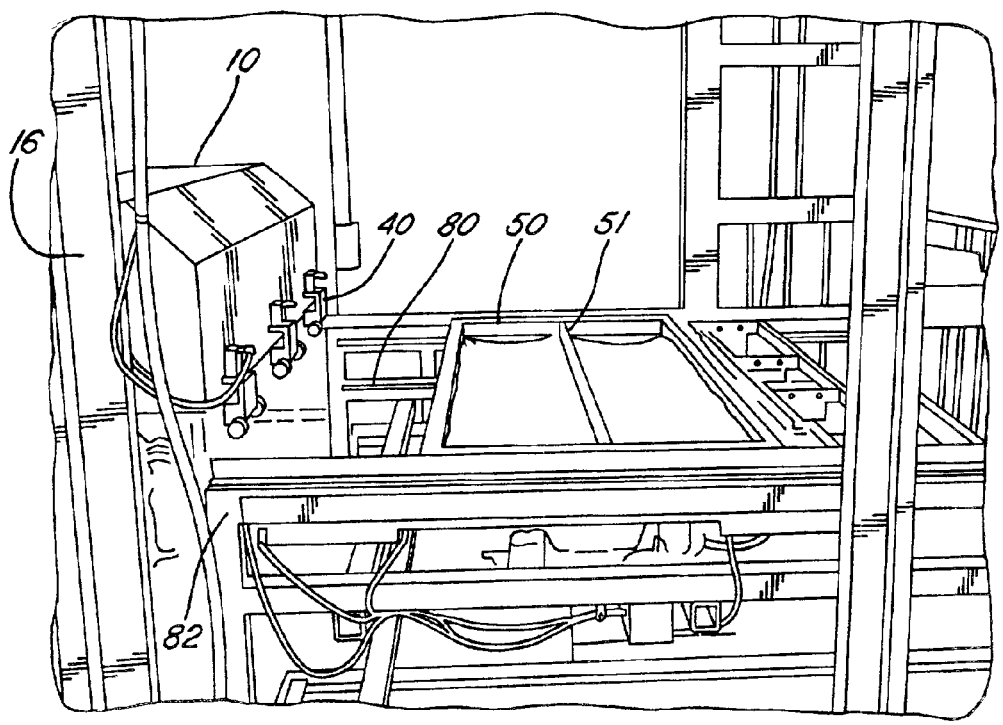
FIG. 4 is a side perspective view illustrating positioning of the bucket in a position lateral of the mold envelope.
Figure 3:
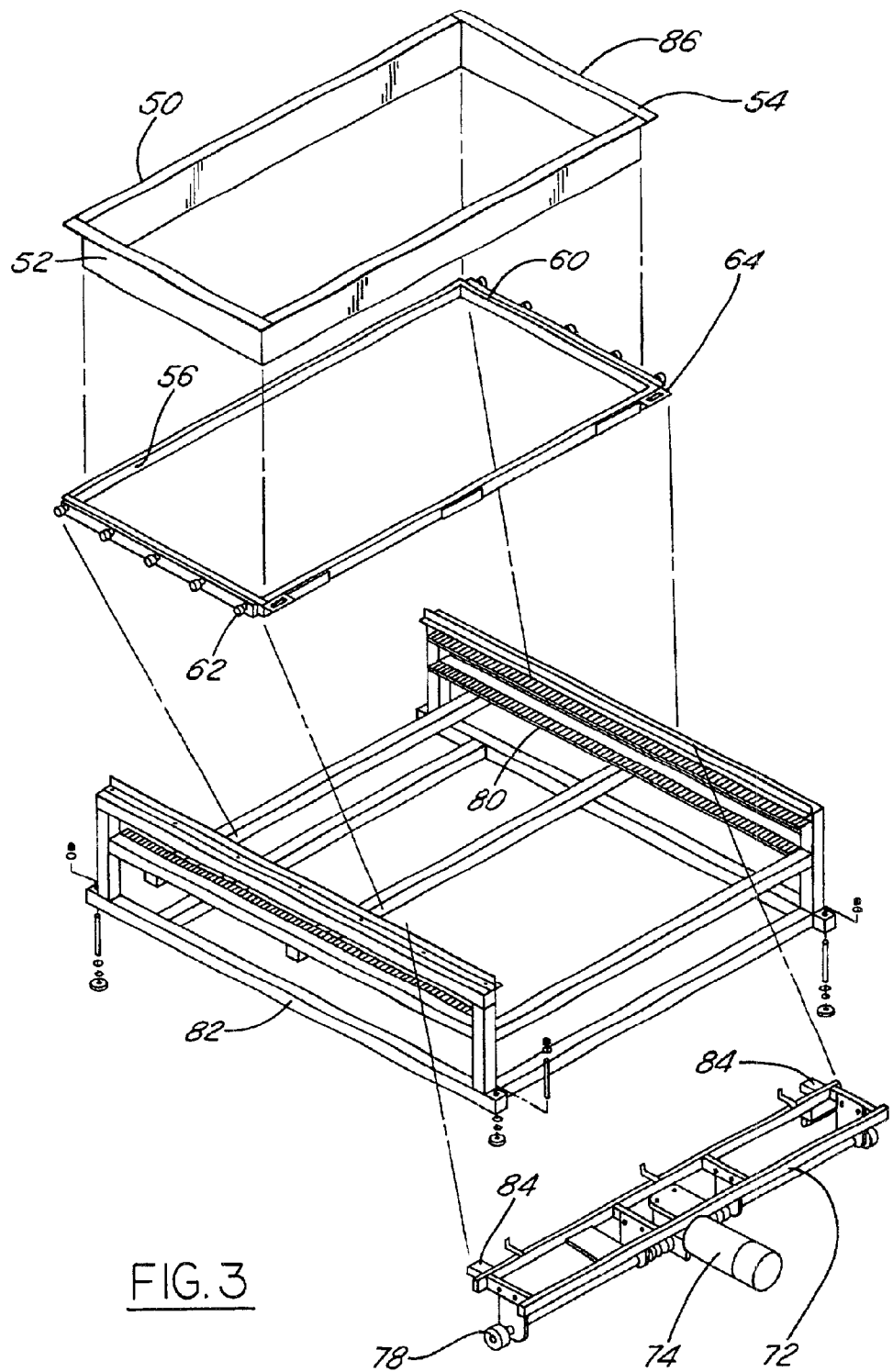
FIG. 3 is an exploded view of the bucket liner, bucket side frame and carriage shown in FIG. 1.
Figure 5:
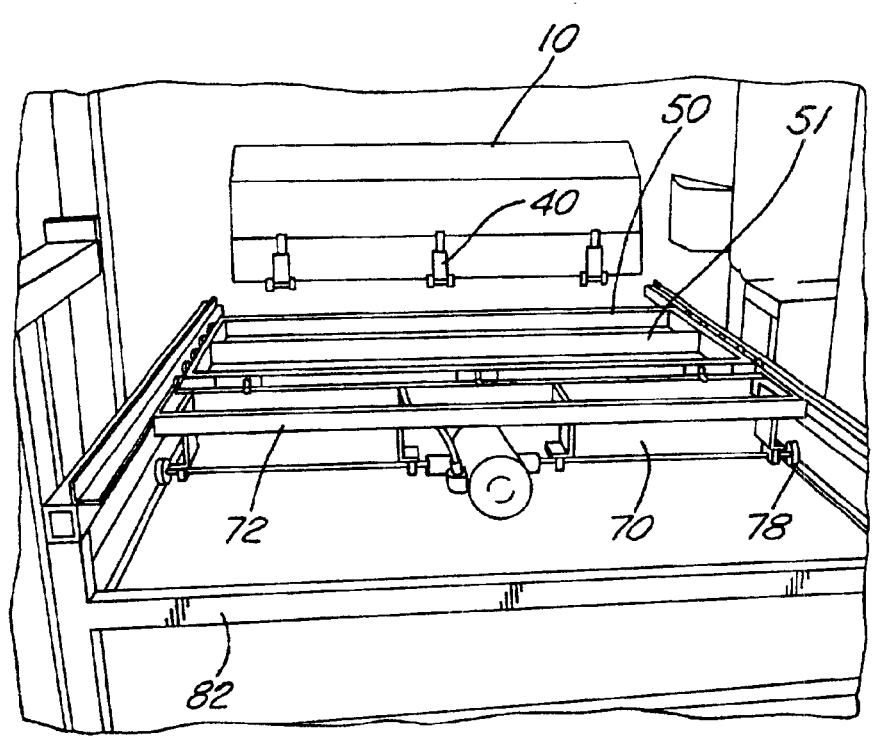
FIG. 5 is a perspective view illustrating placement of the bucket to a position closing the opening of the mold envelope.

To hold the polymeric feed-stock material, there is provided feed-stock bucket 50. The bucket 50 includes a liner 52. The liner 52 can hold a powdered polymeric feed-stock material or a liquid material if so desired. The liner may have a longitudinal divider 51 (FIGS. 4–5). The liner has along its top perimeter a generally horizontally extending flange 54. The liner 52 is fitted within an opening 56 of a bucket frame 58. The frame 58 has a top surface 60 to support the liner 52. As apparent to those skilled in the art in situations wherein it is desirable to be able to clean the bucket 50, the liner 52 can simply be lifted up and removed and a clean liner 52 can be inserted within the opening 56. The frame 58 at its extreme end has a series of rotatably connected rollers 62 to facilitate lateral movement. Preferably there are at least four rollers with at least two on opposite sides of the bucket 50. The frame 58 also has fixably connected thereto eyelets 64.

FIG. 4 shows the bucket 50 in its first position, generally lateral of the mold envelope, parallel and at the same elevation as the channel members 24. As shown in FIG. 5, the bucket 50 is in a second position closing off the mold envelope opening 14 with flange 54 being captured by the channel members 24.

Figure 6:
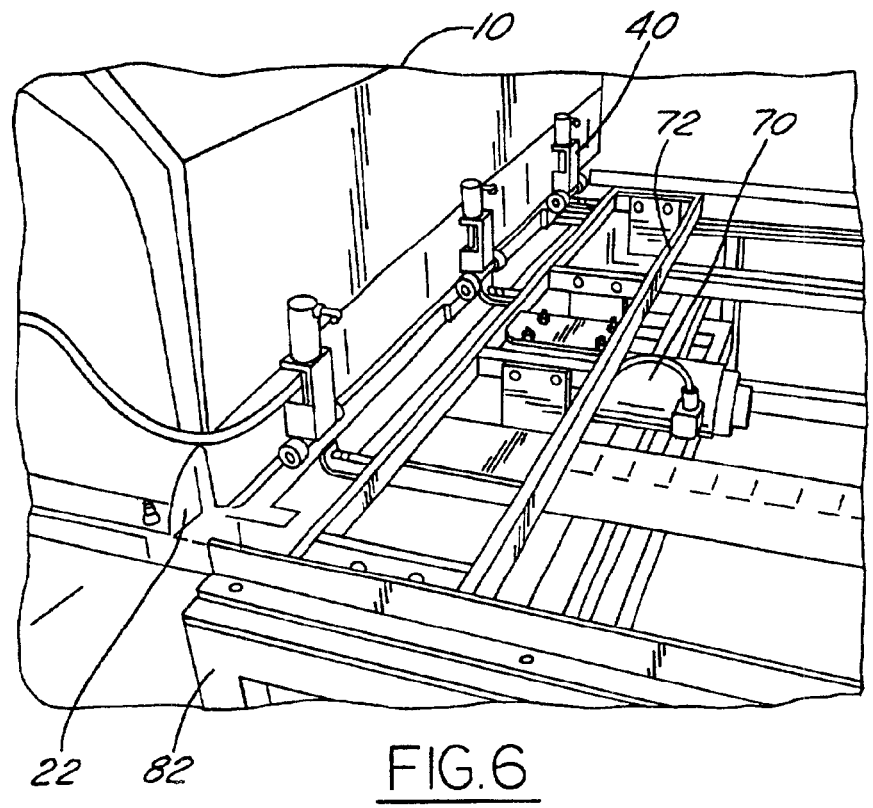
FIG. 6 is a perspective view illustrating the bucket being lateral of the mold envelope in a position similar to that as shown in FIG. 4.
Figure 7:
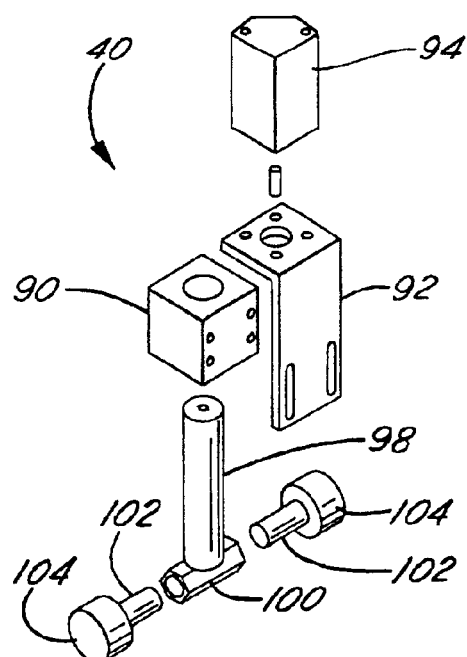
FIG. 7 is an exploded view of a clamp utilized in the apparatus of the present invention.
Figure 8:
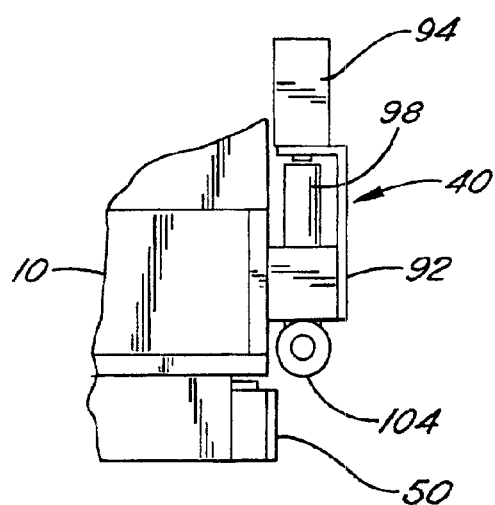
FIG. 8 is a side elevational view illustrating the clamp shown in FIG. 7 attached to the mold envelope in a retracted position.
Figure 9:
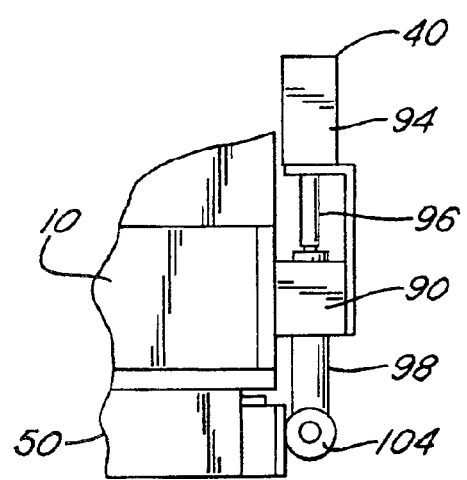
FIG. 9 is a view illustrating the clamp of FIG. 8 in the extended position.

To move the bucket 50 between its first and second positions, there is provided a carriage 70. The carriage 70 includes a chassis 72. The carriage chassis 72 supports a motor 74. The motor 74 powers two shafts 76. The shafts 76 power roller gears 78. The roller gears 78 are engaged with tracks 80. The tracks 80 are supported on a side frame 82 on which the carriage 70 and bucket 50 are slidably mounted. As best shown in FIG. 6, the rollers 62 will typically be at a higher elevation than the carriage roller gears 78.

In operation, to connect to the bucket, carriage 70 has two retractable pneumatically driven pins 84 that the carriage extends to be captured within the eyelets 64 of the bucket. The carriage is then automatically or by operator command moved to place the bucket into a position wherein the powdered polymeric work stock material can be placed within the liner 52 of the bucket. The carriage is then commanded to move the bucket 50 from its first position lateral of the mold envelope 10 to its second position wherein it closes off the mold envelope opening 14. The flange 54 of the liner will contact the cone 34 and will be slightly cammed upward toward the mold envelope. The flange 54 along edges 86 will be captured within the channel members 24. Activation of the clamps 40 will secure the bucket 50 with the mold envelope 10.

Referring additionally to FIGS. 7–10, the clamps 40 include a block 90 that is fixably connected to the mold envelope on a side of the mold envelope generally opposite the stops 28. The block 90 additionally supports an L bracket 92. The top of the L bracket 92 supports a linear actuator 94. Linear actuator 94 has a rod 96, generally axially aligned with a rod extension 98. The rod extension 98 is fixably connected to a cross-arm 100 with a bore to receive shafts 102 of rollers 104. Rollers 104 can be made to be slightly compliant if so desired.

Figure 10:
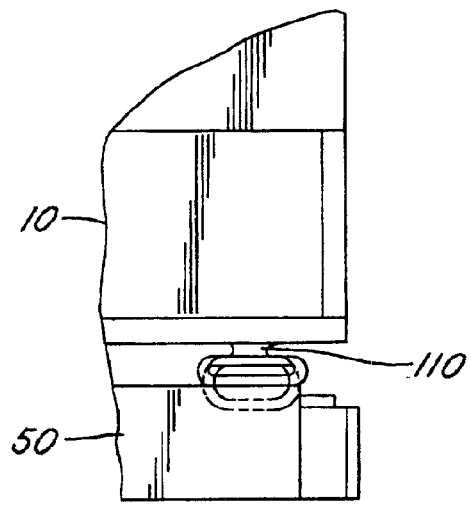
FIG. 10 is a partial side elevational view illustrating a bladder seal of the present invention, with the clamp of FIGS. 7–9 removed for clarity of illustration.

After the bucket 50 has been positioned adjacent the mold envelope 10, the clamps 40 are actuated vertically downward in a direction generally perpendicular to a plane of travel provided by movement of the bucket 50 by the carriage 70. The bucket, now as shown in FIG. 10, will be laterally captured between the stops 28 and the rollers 104. To allow the bucket to freely travel from its loading position to its position aligning with the mold envelope 10, there is additionally provided a selectively inflatable bladder seal 110 that provides an active seal to eliminate any clearance between the mold envelope 10 and the bucket 50. This seal will be maintained during the rotation of the mold envelope 10. The bladder seal follows the flange 54 around the liner 52.

The pins 84 of the carriage prior to, or shortly after the activation of the clamps 40, will retract to release the carriage 70 from the bucket 50. After the activation of the seal 110, the bucket 50 is securely sealed with the mold envelope 10 and the mold envelope 10 will be rotated about its shafts 18 causing the powdered polymeric material to melt and be formed within the cavity provided by the mold envelope 10 to form membrane skin 112.

After an appropriate curing and/or cool down time, the clamp 40 will release the bucket from the mold envelope 10. An operator will use an appropriate cutting knife if required to cut any portion of the multiform membrane 112 from any material which may have adhered to the bucket. The carriage will come to a position adjacent to the mold envelope and pins 84 will be extended into the bucket frame eyelets 64. Bucket 50 will then be removed. The mold envelope 10 is then rotated to position opening 14 upwards and an operator will pull the polymeric membrane 112 from the mold envelope. Typically, there will be sufficient material within the bucket such that the bucket need not be taken to a refilling station but held in a position generally adjacent to the mold envelope for two or three additional molding cycles.

Although an embodiment of the present invention has been shown, it will be apparent to those skilled in the art of the various modifications which can be made to the present invention without departing from the spirit and scope of the invention as it is encompassed by the following claims.

I claim:

1. An apparatus for molding a polymeric multiform membrane comprising:

a rotatable heated mold envelope having an opening and channel members extending generally lateral of said opening;

a bucket for bolding a polymeric material, said bucket being movable in a direction generally parallel with said channel members between a first position lateral of said mold envelope opening to a second position captured by said channel members closing said opening;

selectively actuatable clamps for securing said bucket to said mold envelope and;

a carriage for laterally moving said bucket between said first and second positions.

2. An apparatus as described in claim 1, wherein said bucket has rollers to facilitate lateral movement of said bucket between said first and second positions.

3. An apparatus as described in claim 2, wherein said bucket has at least four rollers, two of said rollers being on opposite sides.

4. An apparatus as described in claim 1, wherein said mold envelope has a stop on one side and a clamp on an opposite side.

5. An apparatus as described in claim 1, wherein said carriage is slidably mounted on a frame.

6. An apparatus as described in claim 5, wherein said carriage has powered rollers on opposite sides thereof to move said carriage on said frame.

7. An apparatus as described in claim 5, wherein said carriage supports a motor which powers said carriage upon said frame.

8. An apparatus as described in claim 6, wherein said carriage rollers are on a different level on said frame than rollers that are connected on said bucket.

9. An apparatus as described in claim 4, wherein said clamp is actuated in a direction generally perpendicular to a plane of movement of said bucket.

10. An apparatus as described in claim 4, wherein said clamp has a roller on an extreme end thereof and said roller laterally urges said bucket against said stop.

11. An apparatus as described in claim 10, wherein said roller is compliant.

12. An apparatus as described in claim 1 further including a bladder seal to seal a clearance between said mold envelope and said bucket.

13. An apparatus as described in claim 12, wherein said seal is selectively inflatable.

14. An apparatus for molding a polymeric multiform membrane comprising:

a rotatable heated mold envelope having a downward directed opening and channel members extending laterally horizontally of said opening;

a bucket for holding a powdered polymeric material, said bucket being laterally movable in a direction generally parallel with said channel members between a first position lateral of said mold envelope opening to a second position captured by said channel members closing said opening;

stops on a first side of said mold envelope for stopping movement of said bucket in said second position;

selectively actuatable clamps connected on said mold envelope generally opposite said stops, said clamps capturing said bucket between said clamps and said stop;

a carriage for laterally moving said bucket between said first and second positions; and a frame for supporting said carriage positioned laterally of said mold envelope.

15. An apparatus as described in claim 14 further including a selectively inflatable seal for sealing a clearance between said bucket and said mold envelope.

16. An apparatus for molding a polymeric multiform membrane comprising:

a rotatable heated mold envelope having an opening and channel members extending generally lateral of said opening;

a bucket for holding a polymeric material, said bucket being movable in a direction generally parallel with said channel members between a first position lateral of said mold envelope opening to a second position captured by said channel members closing said opening;

selectively actuatable clamps for securing said bucket to said mold envelope;

a carriage for laterally moving said bucket between said first and second positions; and wherein said mold envelope has a stop on one side and a clamp on an opposite side and said clamp captures said bucket between said clamp and said stop.

* * * * *